US012596245B2

(12) United States Patent
Bang et al.

(10) Patent No.: US 12,596,245 B2
(45) Date of Patent: Apr. 7, 2026

(54) ULTRA-COMPACT LENS SYSTEM FOR FLUORESCENCE IMAGING

(71) Applicant: OSONG MEDICAL INNOVATION FOUNDATION, Cheongju-si (KR)

(72) Inventors: Hyeon Jin Bang, Cheongju-si (KR); Seung Rag Lee, Sejong (KR); Byung Jun Park, Sejong (KR); Ki Ri Lee, Sejong (KR); Eung Jang Lee, Seoul (KR)

(73) Assignee: OSONG MEDICAL INNOVATION FOUNDATION, Cheongju-si (KR)

( * ) Notice: Subject to any disclaimer, the term of this patent is extended or adjusted under 35 U.S.C. 154(b) by 275 days.

(21) Appl. No.: 18/281,809

(22) PCT Filed: Feb. 15, 2022

(86) PCT No.: PCT/KR2022/002245
§ 371 (c)(1),
(2) Date: Sep. 13, 2023

(87) PCT Pub. No.: WO2022/215853
PCT Pub. Date: Oct. 13, 2022

(65) Prior Publication Data
US 2024/0160004 A1      May 16, 2024

(30) Foreign Application Priority Data
Apr. 7, 2021    (KR) ........................ 10-2021-0045060

(51) Int. Cl.
G02B 23/24          (2006.01)
(52) U.S. Cl.
CPC ................................. *G02B 23/243* (2013.01)

(58) Field of Classification Search
CPC ........ G02B 1/10; G02B 13/002; G02B 13/18; G02B 13/0035; G02B 5/20; G02B 9/12;
(Continued)

(56) References Cited

U.S. PATENT DOCUMENTS 6,414,802 B1    7/2002  Betensky
7,589,872 B2    9/2009  Takeyama
(Continued)

FOREIGN PATENT DOCUMENTS

JP          1999038316 A      7/1997
JP          H1078543 A  *   3/1998  ........... G02B 13/006
(Continued)

OTHER PUBLICATIONS

Extended European Search Report issued on Mar. 3, 2025.
(Continued)

*Primary Examiner* — Balram T Parbadia
*Assistant Examiner* — Samanvitha Sridhar
(74) *Attorney, Agent, or Firm* — LEEPI

(57)          ABSTRACT

An ultra-compact lens system for fluorescence imaging includes a first lens, a second lens and third lens. The first lens has a Meniscus shape including first and second surfaces facing each other. The first surface is concave, and each of the first and second surfaces is an aspherical surface. The second lens is adjacent to the first lens and includes third and fourth surfaces facing each other. Each of the third and fourth surfaces is convex and aspherical surface. The third lens is adjacent to the second lens and includes fifth and sixth surfaces facing each other. Each of the fifth and sixth surfaces is concave and aspherical surface.

6 Claims, 6 Drawing Sheets

(58) Field of Classification Search
CPC .............. G02B 9/16; G02B 15/143503; A61B
1/00096–0646
See application file for complete search history.

(56) References Cited

U.S. PATENT DOCUMENTS

| | | | |
|---|---|---|---|
| 2014/0184882 A1* | 7/2014 | Kuzuhara ................ | G02B 7/14 |
| | | | 359/739 |
| 2016/0178884 A1 | 6/2016 | Hanada et al. | |
| 2021/0231927 A1* | 7/2021 | Kawamura ............ | G02B 15/20 |

FOREIGN PATENT DOCUMENTS

| | | | | |
|---|---|---|---|---|
| JP | H1138316 A | * | 2/1999 | |
| JP | 2003149545 A | * | 5/2003 | ........... G02B 13/001 |
| JP | 2005308964 A | * | 11/2005 | |
| JP | 2011017918 A | | 1/2011 | |
| JP | 2015045837 A | | 3/2015 | |
| JP | 2015060019 A | | 3/2015 | |
| KR | 20040011354 A | | 2/2004 | |
| KR | 20130029263 A | | 3/2013 | |
| KR | 20180064780 A | | 6/2018 | |
| WO | 2014013677 A | | 1/2014 | |
| WO | 2020067385 A | | 4/2020 | |

OTHER PUBLICATIONS

International search report issued on Jul. 13, 2022.
Japanese patent application office action issued on Aug. 26, 2024.

* cited by examiner 656.2800NM
546.0700NM
486.1300NM

DISTORTION

ANGLE(deg)

50.00

37.50

25.50

12.50

-50   -25   0   25   50

DISTORTION

ASTIGMATIC
FIELD CURVES

ANGLE(deg)

50.00

37.50

25.50

12.50

-0.100  -0.050  0.0  0.050  0.100

FOCUS (MILLIMETERS)

LONGITUDINAL
SPHERICAL ABER 1.00

0.75

0.50

0.25

-0.100  -0.050  0.0  0.050  0.100

FOCUS (MILLIMETERS)

F I G .  5
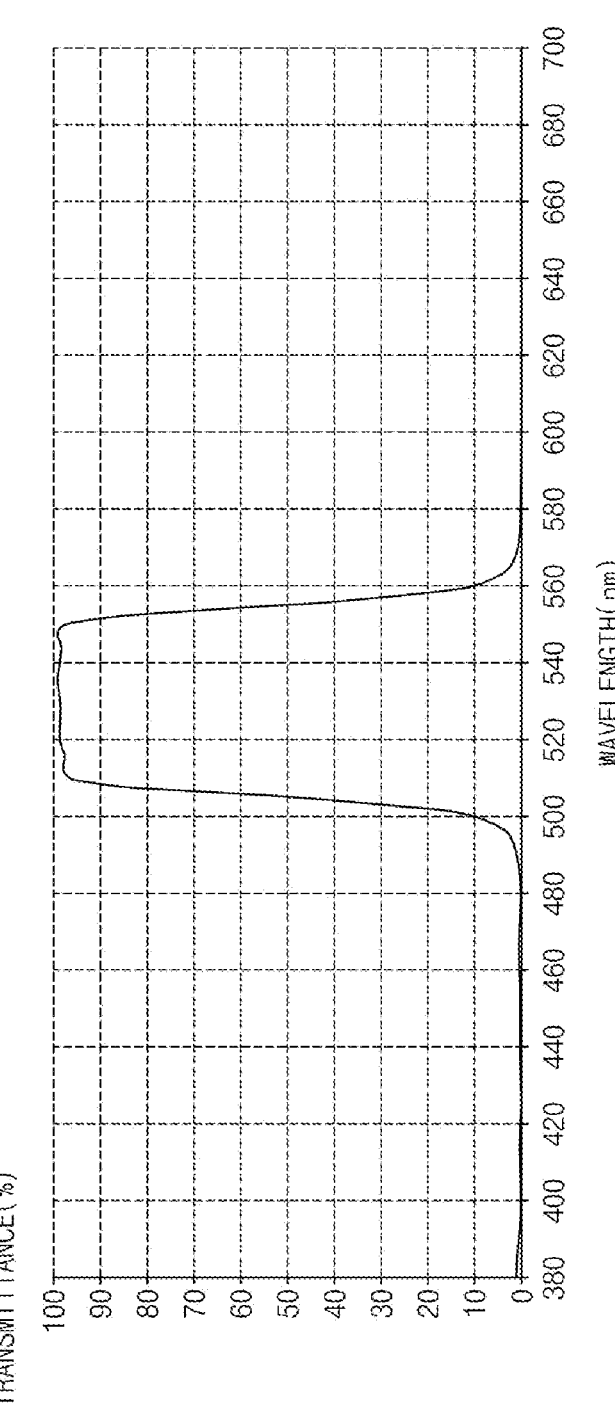

ULTRA-COMPACT LENS SYSTEM FOR FLUORESCENCE IMAGING

BACKGROUND OF THE INVENTION

Technical Field

Exemplary embodiments of the present invention relate to an ultra-compact lens system for fluorescence imaging. More particularly, exemplary embodiments of the present invention relate to an ultra-compact lens system for fluorescence imaging capable of being applied to fluorescence molecular imaging endoscopes for precise diagnosis of cancer based on fluorescence imaging, and being used in disposable endoscopes and optical imaging diagnostic devices.

Discussion of the Related Art

Recently, especially with the steady increase in digestive cancer, there is an increasing demand for the development of endoscopic technology capable of precise diagnosis of digestive diseases.

Meanwhile, in the case of conventional general endoscopes, since they rely only on morphological observation of tissue, when a precise diagnosis is necessary, a biopsy must be performed. However, during the biopsy, tissue must be biopsied from surrounding areas in addition to the suspected area, resulting in wounds or bleeding in unnecessary areas.

To solve these problems with conventional endoscopes, various optical access technologies have recently been developed that can directly diagnose tissue lesions during endoscope observation. As disclosed in Korean Patent No. 10-1889914, by combining an ultra-small camera module with an endoscope, a system capable of optical diagnosis as described above is being developed.

However, in the case of an endoscopic device combined with such an optical module, the performance of the optical lens is most important, because the ability to diagnose lesions is determined by the performance of the optical lens.

In particular, in order to improve the performance of these optical lenses, it is necessary to properly adjust the F-number and focal length of the optical system and design the optical system with sufficient consideration of resolution. Further, the coating method of the optical lens, selection and assembly method of the optical filter, etc. must be optimally selected.

However, until now, technology for designing such optimized optical lenses has not been developed.

The related prior art is Korean Patent No. 10-1889914.

SUMMARY

Exemplary embodiments of the present invention provide to an ultra-compact lens system for fluorescence imaging capable of providing a low-cost endoscope system while minimizing light loss, and performing precise cancer diagnosis based on fluorescence imaging based on high resolution.

According to one aspect of the present invention, the ultra-compact lens system for fluorescence imaging includes a first lens, a second lens and third lens. The first lens has a Meniscus shape including first and second surfaces facing each other. The first surface is concave, and each of the first and second surfaces is an aspherical surface. The second lens is adjacent to the first lens and includes third and fourth surfaces facing each other. Each of the third and fourth surfaces is convex and aspherical surface. The third lens is adjacent to the second lens and includes fifth and sixth surfaces facing each other. Each of the fifth and sixth surfaces is concave and aspherical surface.

In an exemplary embodiment, the first lens may have a negative (−) refractive power, the second lens may have a positive (+) refractive power, and the third lens may have a negative (−) refractive power.

In an exemplary embodiment, the lens system may further include a glass adjacent to the third lens and including seventh and eighth surfaces facing each other, and an iris having a ninth surface between the first and second lens.

In an exemplary embodiment, Equation (1) may be satisfied, $$3.5 < \frac{TTL}{F} < 5.0 \qquad \text{Equation (1)}$$

when the distance from the first surface of the first lens to an upper surface located outside of the glass is TTL and a focal length of the lens system is F.

In an exemplary embodiment, Equation (2) may be satisfied, $$0.45 < \left| \frac{(R1 - R2)}{(R1 + R2)} \right| < 0.6 \qquad \text{Equation (2)}$$

when a radius of curvature of the first surface of the first lens is R1, and a radius of curvature of the second surface of the first lens is R2.

In an exemplary embodiment, Equation (3) may be satisfied, $$0.8 < \frac{f2}{F} < 1.0 \qquad \text{Equation (3)}$$

when a focal length of the second lens is f2, and a focal length of the lens system is F.

In an exemplary embodiment, Equation (4) may be satisfied, $$Vd1 > Vd3 \qquad \text{Equation (4)}$$

when an Abbe's number of the first lens is Vd1, and an Abbe's number of the third lens is Vd3.

In an exemplary embodiment, Equation (5) may be satisfied, $$0.4 < \left| \frac{f2}{f3} \right| < 0.65 \qquad \text{Equation (5)}$$

when a focal length of the second lens is f2, and a focal length of the third lens is f3.

In an exemplary embodiment, the aspherical surface may be defined as Equation (6), $$z = \frac{ch^2}{1 + \sqrt{1 - (1+k)c^2 h^2}} + Ah^4 + Bh^6 + Ch^8 + Dh^{10} + \dots \qquad \text{Equation (6)}$$

when z is a distance in a direction of an optical axis from a vertex of the lens system, h is a distance in a direction perpendicular to the optical axis, c is a radius of curvature at the vertex, k is a conic constant, A is a quaternary aspherical coefficient, B is a $6^{th}$ order aspherical coefficient, C is a $8^{th}$ order aspherical coefficient, and D is a $10^{th}$ order aspherical coefficient.

In an exemplary embodiment, at least one of the first to sixth surfaces may be coated to allow only wavelengths of light sources in a predetermined range to pass through, and a tangential angle of the coated surface may be ±5° or less.

According to exemplary embodiments of the present invention, the ultra-compact lens system for fluorescence imaging has a total of three lenses arranged in a row, and the shape, structure, and design of each lens are designed as described above. In addition, the ultra-compact lens system includes at least one refractive surface capable of band-pass filter coating, and the coating may be applied depending on the characteristics of the contrast agent used. Thus, a compact optical system may be implemented and the manufacturing cost for the optical system may be decreased.

In addition, for refractive surfaces that can be coated, multi-coating is possible to match the characteristics of not only one contrast agent but also two or more contrast agents, thereby expanding the range of use for fluorescent image acquisition.

That is, coating may be performed on at least one of the refractive surfaces so that only the wavelength of a light source in a specific range passes through. In this case, the tangential angle of the coated surface is maintained at ±5° or less, thereby transmittance characteristics for each wavelength of incident light may be secured at a certain level or higher.

In particular, it provides wide-angle images with a field of view of more than 100° using three lenses, making it possible to acquire fluorescent images of a relatively wide area within the living body. In addition, even though the optical system includes an aspherical surface, the inflection point is minimized and the lens shape is designed with ease of production in mind to reduce production costs. Thus, it may be effectively applied not only to fluorescent molecular imaging endoscopes but also to disposable endoscopes and optical imaging diagnostic devices.

BRIEF DESCRIPTION OF THE DRAWINGS

FIG. 5 is a graph showing the results of a coating simulation in the emission wavelength range of a fluorescein isothio-cyanate (FITC) contrast agent for a refractive surface whose tangential angle does not exceed ±5° in the lens system of FIG. 1 or FIG. 3.

Figure 1:
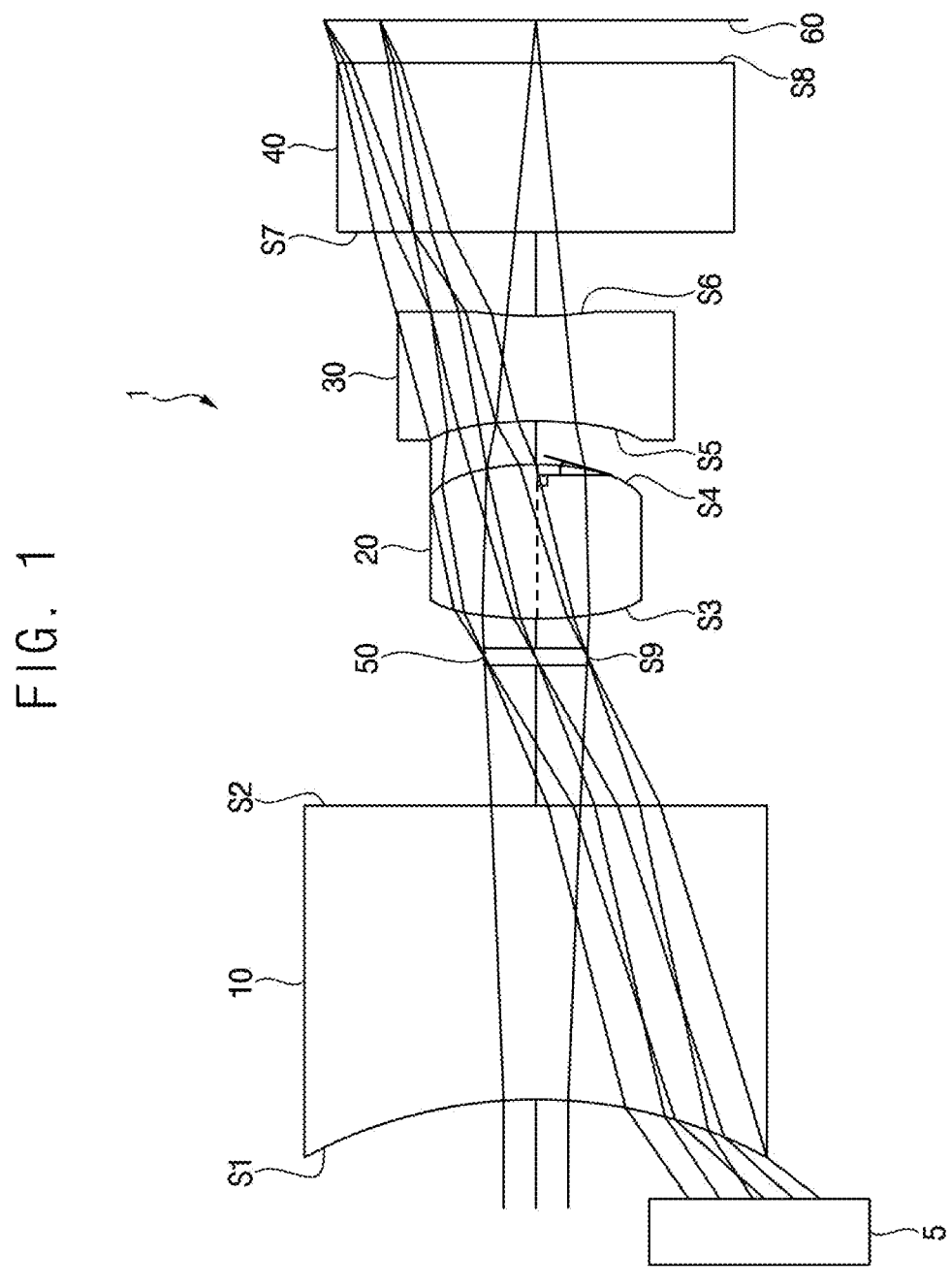
FIG. 1 is an ultra-compact lens system for fluorescence imaging according to an example embodiment of the present invention.

| <reference numerals> | |
| --- | --- |
| 1, 2: lens system | 10, 11: first lens |
| 20, 21: second lens | 30, 31: third lens |
| 40, 41: glass | 50, 51: iris |
| 60, 61: upper surface | |

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
FIG. 2 is a graph showing longitudinal spherical aberration, astigmatism and distortion aberration of the lens system of FIG. 1.

FIG. 1 is an ultra-compact lens system for fluorescence imaging according to an example embodiment of the present invention. FIG. 2 is a graph showing longitudinal spherical aberration, astigmatism and distortion aberration of the lens system of FIG. 1.

Referring to FIG. 1, the ultra-compact lens system for fluorescence imaging 1 (hereinafter, the lens system) includes a first lens 10, a second lens 20, a third lens 30, a glass 40 and an iris 50.

Here, the first lens 10 is disposed adjacent to an object 5 subject to photography, and the first lens 10, the iris 50, the second lens 20, the third lens 30 and the glass 40 are sequentially disposed from the object 5. An upper surface 60 is disposed outside of the glass 40.

Here, the upper surface 60 may be defined as an outer surface of an additional structure disposed adjacent to the glass 40, or an outer surface of the lens system 1. Further, the upper surface 60 may be an image sensor of CCD or CMOS and so on.

In FIG. 1, the lenses are arranged from a left side to a right side, but the arrangement of FIG. 1 may be an example. Thus, the lenses may be arranged from a lower side to an upper side, and the lenses may be arranged variously if the lenses are arranged in a row from the object 5 subject to photography.

The first lens 10 has a predetermined thickness, and includes a first surface S1 and a second surface S2 facing each other.

The first surface S1 is disposed in a direction toward the object 5, and the second surface S2 is disposed in a direction opposite to the first surface S1.

Here, each of the first and second surfaces S1 and S2 is an aspherical surface. The first surface S1 is concave, and the second surface S2 is convex.

The first surface S1 is formed to be concave toward the object 5, and the second surface S2 is formed to be convex toward the iris 50.

Thus, the first lens 10 has a Meniscus shape in a whole.

In addition, the first lens 10 has a negative (−) refractive power.

The iris 50 has an iris surface S9, and is disposed between the first and second lenses 10 and 20.

The second lens 20 is disposed adjacent to the first lens 10 while the iris 50 is disposed between the first and second lenses 10 and 20, and thus the first lens 10 is disposed between the object 5 and the iris 50.

The second lens 20 has a predetermined thickness and includes a third surface S3 and a fourth surface S4 facing each other.

The third surface S3 is disposed in a direction toward the first lens 10, and the fourth surface S4 is disposed in a direction opposite to the third surface S3.

Here, each of the third and fourth surfaces S3 and S4 is an aspherical surface, that is, the surface does not correspond to a portion of the sphere, and each of the third and fourth surfaces S3 and S4 is convex.

The third surface S3 is protruded toward the iris 50, and the fourth surface S4 is protruded toward the third lens 30 explained below.

The second lens 20 has a positive (+) refractive power.

The third lens 30 is disposed adjacent to the second lens 20, and thus the second lens 20 is disposed between the iris 50 and the third lens 30.

The third lens 30 has a predetermined thickness, and includes a fifth surface S5 and a sixth surface S6 facing each other.

The fifth surface S5 is disposed in a direction toward the second lens 20, and the sixth surface S6 is disposed in a direction opposite to the fifth surface S5.

Here, each of the fifth and sixth surfaces S5 and S6 is an aspherical surface, and each of the fifth and sixth surfaces S5 and S6 is concave.

The fifth surface S5 is concave toward the second lens 20, and the sixth surface S6 is concave toward the glass 40 explained below.

In addition, the third lens 30 has a negative (−) refractive power.

The glass 40 is disposed between the third lens 30 and the upper surface 60, and includes a seventh surface S7 and an eighth surface S8.

Here, each of the seventh surface S7 and the eighth surface S8 is parallel with each other, without being concave or convex, as illustrated in FIG. 1.

The lens system 1 according to the present example embodiment satisfies Equations (1) to (6), and hereinafter Equations (1) to (6) are explained in detail.

First, the lens system 1 satisfies Equation (1) below, when the distance from the first surface S1 of the first lens 10 to the upper surface 60 located outside of the glass 40 is TTL and a focal length of the lens system 1 is F.

$$3.5 < \frac{TTL}{F} < 5.0 \qquad \text{Equation (1)}$$

Equation (1) defines the total length of the lens system 1. When a lower limit of Equation (1) is less than 3.5, the total length of the lens system 1 is shortened and the optical system may be implemented with a relatively small size, but lens tolerance management and manufacturability may be significantly reduced.

In addition, an angle of the principal ray incident to the upper surface 60 increases, and as the angle of the principal ray increases, the ambient light ratio may be difficult to be corrected and a brightness of the peripheral portion of the upper surface 60 decreases compared to the center of the upper surface 60.

When an upper limit of Equation (1) is over 5.0, the total length of the lens system 1 is lengthened and an ultra-compact optical system may be hard to be implemented.

Thus, Equation (1) should be satisfied.

In addition, the lens system 1 satisfies Equation (2), when a radius of curvature of the first surface S1 of the first lens 10 is R1, and a radius of curvature of the second surface S2 of the first lens 10 is R2.

$$0.45 < \left| \frac{(R1 - R2)}{(R1 + R2)} \right| < 0.6 \qquad \text{Equation (2)}$$

Equation (2) defines the shape of the first lens 10. When a lower limit of Equation (2) is less than 0.45, the first lens 10 becomes difficult to correct aberrations due to a decrease in refractive power, and the overall length of the optical system may increase.

Alternatively, when an upper limit of Equation (2) is over 0.6, the first lens 10 may be advantageous in securing a wide angle of view, but the curvature of the first surface S1 may be increased and manufacturability may be significantly reduced.

Thus, Equation (2) should be satisfied.

In addition, the lens system 1 satisfies Equation (3), when a focal length of the second lens 20 is f2, and a focal length of the lens system 1 is F.

$$0.8 < \frac{f2}{F} < 1.0 \qquad \text{Equation (3)}$$

Equation (3) defines the focal length and the shape of the second lens 20. When a lower limit of Equation (3) is less than 0.8, the refractive power of the second lens 20 increases, which is advantageous for miniaturization, but as curvature increases, spherical aberration and coma aberration increase. In addition, manufacturing and tolerance management of the second lens 20 become difficult.

When an upper limit of Equation (3) is over 1.0, the refractive power decreases as the focal length of the second lens 20 increases, and this may be disadvantageous in miniaturizing the optical system and there are limitations in correcting various aberrations, which may deteriorate optical performance.

Thus, Equation (3) should be satisfied.

In addition, the lens system 1 satisfies Equation (4), when an Abbe's number of the first lens 10 is Vd1, and an Abbe's number of the third lens 30 is Vd3.

$$Vd1 > Vd3 \qquad \text{Equation (4)}$$

Equation (4) is for aberration correction and performance improvement of the optical system, and the first lens 10 has a glass material having the same Abbe's number as the second lens 20. Thus, the Abbe's number of each of the first and second lenses 10 and 20 is maintained to be higher than that of the third lens 30, so that miniaturization may be achieved while reducing chromatic aberration and improving resolution.

Thus, Equation (4) should be satisfied.

In addition, the lens system 1 satisfies Equation (5), when a focal length of the second lens 20 is f2, and a focal length of the third lens 30 is f3.

$$0.4 < \left| \frac{f2}{f3} \right| < 0.65 \qquad \text{Equation (5)}$$

Equation (5) is an equation satisfying the correlation between the second lens 20 and the third lens 30. When a lower limit of Equation (5) is less than 0.4, correction of field curvature becomes difficult and the overall performance of the optical system may deteriorate.

In addition, when an upper limit of Equation (5) is over 0.65, an angle of the principal ray incident on the upper surface 60 increases and the peripheral light ratio may decrease. In addition, field curvature and performance correction may be advantageous, but manufacturability of the second lens 20 may be reduced. Further, tolerance management of the second lens 20 and the third lens 30 becomes difficult.

Thus, Equation (5) should be satisfied.

Further, as explained above, in the lens system 1, each of the first surface S1 and the second surface S2 of the first lens 10 is the aspherical surface, each of the third surface S3 and the fourth surface S4 of the second lens 20 is the aspherical surface, and each of the fifth surface S5 and the sixth surface S6 of the third lens 30 is the aspherical surface. Here, the aspherical surface is defined as Equation (6)

$$z = \frac{ch^2}{1 + \sqrt{1 - (1+k)c^2 h^2}} + Ah^4 + Bh^6 + Ch^8 + Dh^{10} + \ldots \qquad \text{Equation (6)}$$

Here, z is a distance in a direction of an optical axis from a vertex of the lens system 1, h is a distance in a direction perpendicular to the optical axis, c is a radius of curvature at the vertex, k is a conic constant, A is a quaternary aspherical coefficient, B is a $6^{th}$ order aspherical coefficient, C is a $8^{th}$ order aspherical coefficient, and D is a $10^{th}$ order aspherical coefficient.

As an example designed lens system 1 of FIG. 1, the designed values of the lens system 1 satisfying Equations (1) to (6) are shown in Table 1 and Table 2. FIG. 2 shows longitudinal spherical aberration, astigmatism and distortion of the lens system 1 designed in Table 1 and Table 2.

Here, in the lens system 1 designed by Table 1 and Table 2 as the example, a F-number (aperture value) is 4, an angle of view is 100°, an effective focal length (EFL) of the overall lens system 1 is 0.615 mm, a focal length f1 of the first lens 10 is −1.832 mm, a focal length f2 of the second lens 20 is 0.571 mm, a focal length f3 of the third lens 30 is −1.241 mm, and a distance TTL from the first surface S1 of the first lens 10 to the upper surface 60 is 2.553 mm.

The longitudinal spherical aberration and astigmatism in FIG. 2 are shown for light having wavelengths of 656.27 nm, 546.07 nm, and 486.13 nm, respectively, and astigmatism and distortion aberration are shown for light with a wavelength of 546.07 nm.

Accordingly, the lens system 1 satisfying Equations (1) to (6) may be designed as in Table 1 and Table 2, and the ultra-compact lens system for fluorescence imaging may be implemented.

TABLE 1

Designed values of the lens system 1

| Surface | Radius of curvature [mm] | Thickness or distance [mm] | Refractive index | Abbe's number | Lens |
|---|---|---|---|---|---|
| S1(aspherical surface) | −0.68000 | 0.700 | 1.589 | 61.2 | First lens |
| S2(aspherical surface) | −2.52557 | 0.345 | | | First lens |
| S9 | infinity | 0.096 | | | Iris |
| S3(aspherical surface) | 0.76073 | 0.363 | 1.589 | 61.2 | Second lens |
| S4(aspherical surface) | −0.50000 | 0.100 | | | Second lens |
| S5(aspherical surface) | −2.10648 | 0.250 | 1.689 | 31.1 | Third lens |
| S6(aspherical surface) | 1.52810 | 0.200 | | | Third lens |
| S7 | infinity | 0.400 | 1.517 | 64.17 | Glass |
| S8 | infinity | | | | Glass |
| Upper surface | infinity | | | | Upper surface |

TABLE 2

Aspherical coefficient of Equation (6)

| Coefficient | Surface | | | | | |
|---|---|---|---|---|---|---|
| | S1 | S2 | S3 | S4 | S5 | S6 |
| k | −3.000000 | 0.000000 | −1.257730 | −1.225419 | 14.375000 | −10.500000 |
| A | 0.942893 | 2.480633 | −0.140082 | −4.658259 | −7.795020 | −2.881517 |
| B | −2.437578 | 5.735241 | −48.978693 | 15.725589 | −15.000000 | 2.731868 |
| C | 3.191434 | −171.345875 | 1360.601067 | −278.617070 | −0.370553 | 7.881135 |
| D | −1.611286 | 867.892442 | −8842.402614 | 3529.255791 | 0.000000 | −148.923023 |

Figure 3:
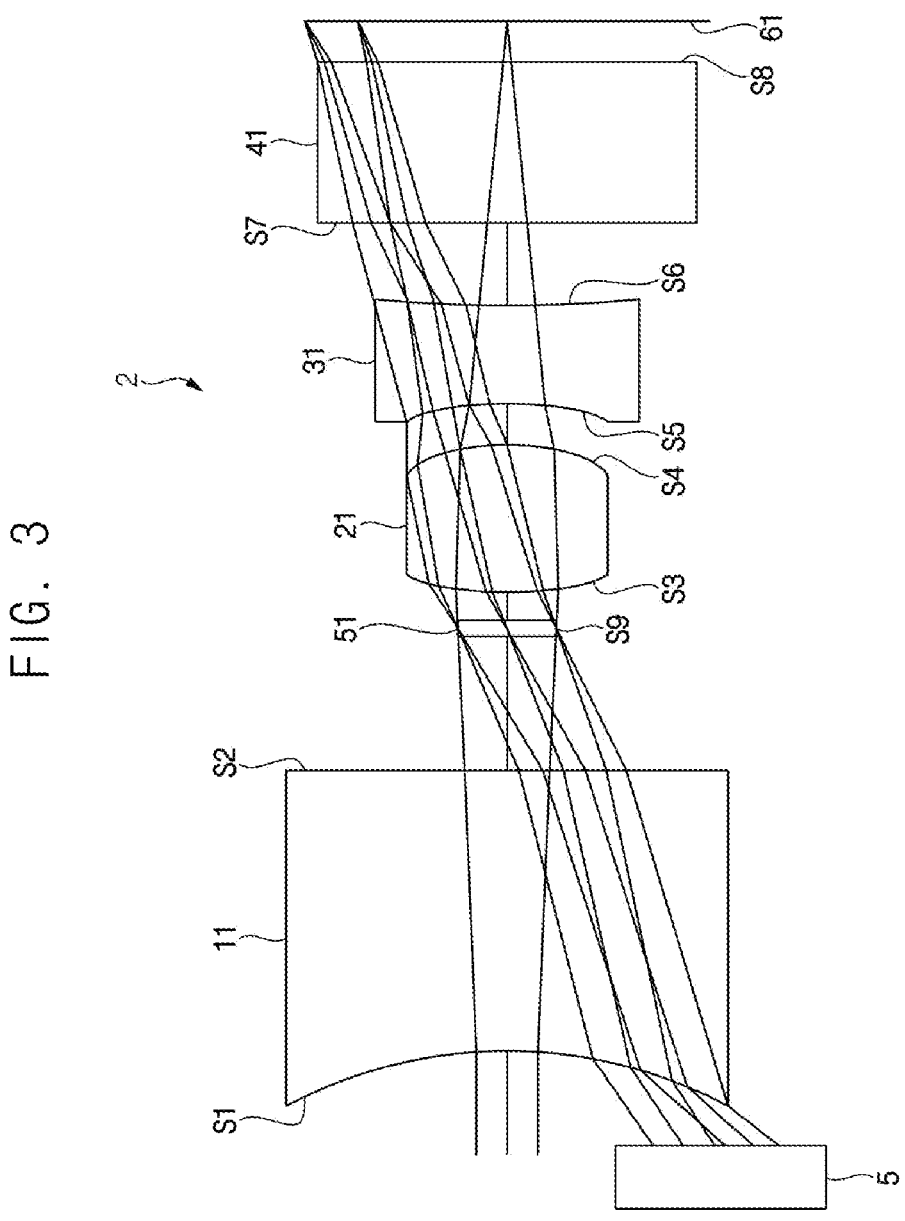
FIG. 3 is an ultra-compact lens system for fluorescence imaging according to another example embodiment of the present invention.
Figure 4:
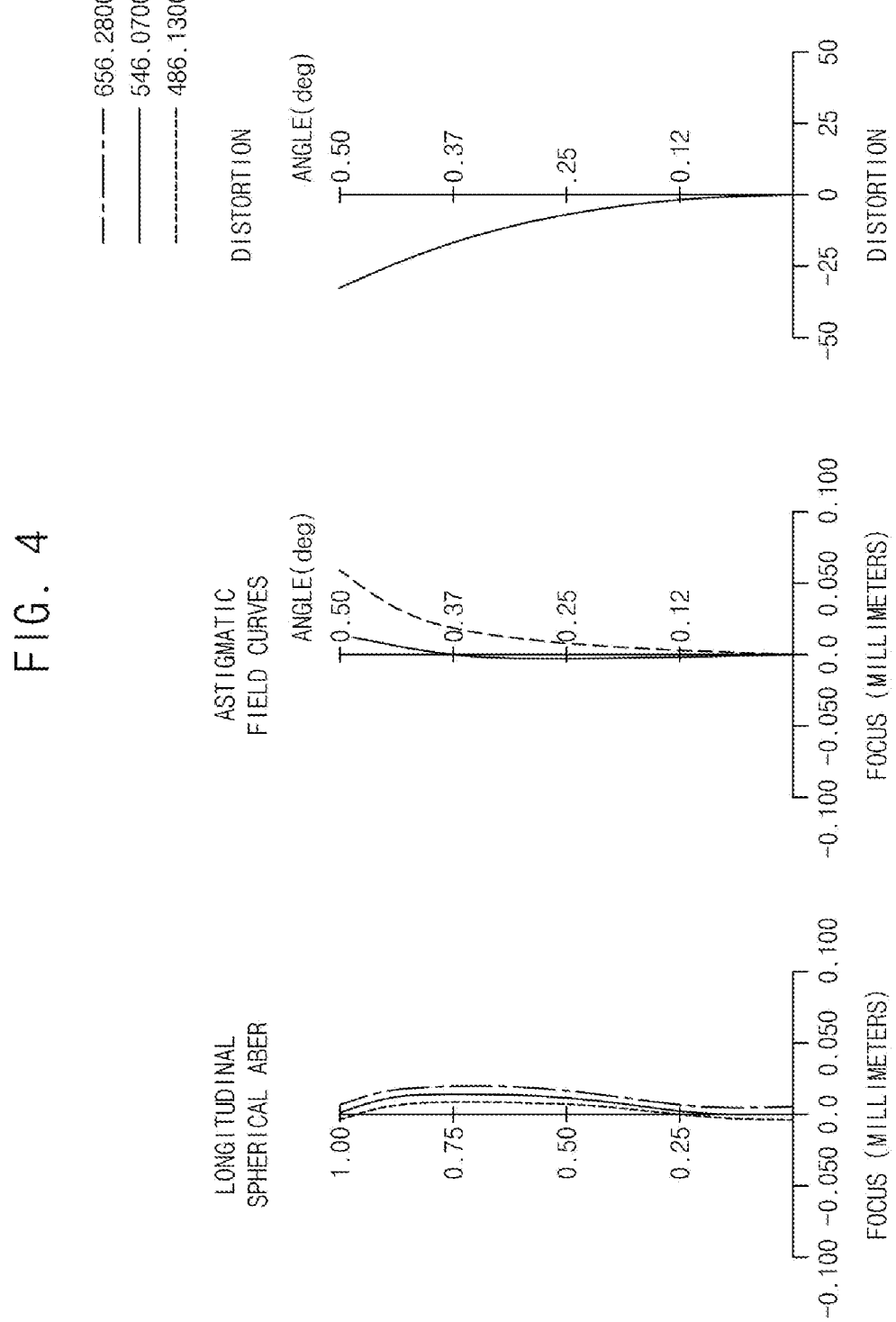
FIG. 4 is a graph showing longitudinal spherical aberration, astigmatism and distortion aberration of the lens system of FIG. 3.

FIG. 3 is an ultra-compact lens system for fluorescence imaging according to another example embodiment of the present invention. FIG. 4 is a graph showing longitudinal spherical aberration, astigmatism and distortion aberration of the lens system of FIG. 3.

The lens system 2 according to the present example embodiment is substantially same as the lens system 1 of FIG. 1, and thus any repetitive explanation of the elements of the lens system 2 is omitted.

Referring to FIG. 3, in the lens system 2, a first lens 11, a second lens 21, a third lens 31, a glass 41, an iris 51 and an upper surface 61 are substantially same as the first lens 10, the second lens 20, the third lens 30, the glass 40, the iris 50 and the upper surface 60, respectively.

Thus, in the lens system 2, Equations (1) to (6) should be satisfied.

However, the lens system 2 may be designed as Table 3 and Table 4, different from the lens system 1, but the designed lens system 2 should satisfy Equations (1) and (6).

FIG. 4 shows longitudinal spherical aberration, astigmatism and distortion of the lens system 2 designed in Table 3 and Table 4.

Here, in the lens system 2 designed by Table 3 and Table 4 as the example, a F-number (aperture value) is 4, an angle of view is 100°, an effective focal length (EFL) of the overall lens system 2 is 0.603 mm, a focal length f1 of the first lens 11 is −2.007 mm, a focal length f2 of the second lens 21 is 0.503 mm, a focal length f3 of the third lens 33 is −0.850 mm, and a distance TTL from the first surface S1 of the first lens 11 to the upper surface 61 is 2.503 mm.

The longitudinal spherical aberration and astigmatism in FIG. 4 are shown for light having wavelengths of 656.27 nm, 546.07 nm, and 486.13 nm, respectively, and astigmatism and distortion aberration are shown for light with a wavelength of 546.07 nm.

TABLE 3

| | Designed values of the lens system 2 | | | | |
|---|---|---|---|---|---|
| Surface | Radius of curvature [mm] | Thickness or distance [mm] | Refractive index | Abbe's number | Lens |
| S1(aspherical surface) | −0.65773 | 0.700 | 1.589 | 61.2 | First lens |
| S2(aspherical surface) | −2.05852 | 0.348 | | | First lens |
| S9 | infinity | 0.100 | | | Iris |
| S3(aspherical surface) | 0.61584 | 0.360 | 1.589 | 61.2 | Second lens |
| S4(aspherical surface) | −0.45000 | 0.040 | | | Second lens |
| S5(aspherical surface) | −1.46175 | 0.250 | 1.689 | 31.1 | Third lens |
| S6(aspherical surface) | 1.05916 | 0.165 | | | Third lens |
| S7 | infinity | 0.400 | 1.517 | 64.17 | Glass |
| S8 | infinity | | | | Glass |
| Upper surface | infinity | | | | Upper surface |

Accordingly, the lens system 2 satisfying Equations (1) to (6) may be designed as in Table 3 and Table 4, and the ultra-compact lens system for fluorescence imaging may be implemented.

TABLE 4

| | Aspherical coefficient of Equation (6) | | | | | |
|---|---|---|---|---|---|---|
| | Surface | | | | | |
| Coefficient | S1 | S2 | S3 | S4 | S5 | S6 |
| k | −1.500000 | 0.000000 | −2.350000 | −0.447201 | 30.12475 | 0.600166 |
| A | 1.382207 | 2.379884 | −0.392707 | −5.967615 | −9.777428 | −3.068979 |
| B | −3.162287 | 6.371671 | 21.059790 | 70.384956 | 39.233094 | 9.253051 |
| C | 3.888726 | −141.418762 | 849.326788 | 44.913384 | 619.581112 | 26.245299 |
| D | −1.851801 | 662.805170 | −8383.661035 | 4781.509996 | −643.230291 | −489.818905 |

Further, in the designed lens systems 1 and 2 explained with reference to FIG. 1 and FIG. 3, Equations (1) to (5) are satisfied as in Table 5.

TABLE 5

| | Satisfaction of Equations (1) to (5) | |
|---|---|---|
| Equation | Lens system 1 | Lens system 2 |
| Equation (1) | 4.152 | 4.154 |
| Equation (2) | −0.576 | −0.516 |
| Equation (3) | 0.929 | 0.834 |
| Equation (4) | 61.15 > 31.08 | 61.15 > 31.08 |
| Equation (5) | −0.461 | −0.591 |

Here, the designed lens systems 1 and 2 as exampled in Table 1 to Table 5, and the designed values as in FIG. 2 to FIG. 4 may be an example, and the lens systems 1 and 2 may be variously designed within a range satisfying Equations (1) to (6).

In the lens systems 1 and 2 according to the example embodiments, each of the refractive surfaces, that is, the first to eighth surfaces of the first to third lenses, may be coated so that a wavelength of a light source having a predetermined range may be passed through.

Here, the coating may be performed on at least one surface of the first to eighth surfaces in the lens systems 1 and 2. Thus, the coated surface may be functioned as a band pass filter through which a predetermined range of wavelength may be passed.

In addition, in the coating, the tangential angle of the coated surface should meet ±5° or less. Here, the tangential angle may be defined as the inclination at the contact point depending on the height of the lens surface with respect to the plane perpendicular to the optical axis of the optical system constituted by the lens systems 1 and 2.

As described above, as the coating on the refractive surface is performed while satisfying the conditions of the tangential angle, only wavelengths of light sources in a specific range can pass through the lens systems 1 and 2.

FIG. 5 is a graph showing the results of a coating simulation in the emission wavelength range of a fluorescein isothio-cyanate (FITC) contrast agent for a refractive surface whose tangential angle does not exceed ±5° in the lens system of FIG. 1 or FIG. 3.

By coating the refractive surfaces of the lens systems 1 and 2, the emission wavelength range of the fluorescein isothio-cyanate (FITC) contrast agent may be limited to a specific region.

For example, as shown in FIG. 5, when the lens systems 1 and 2 limit the range of the radiation wavelength range of the FITC contrast agent, the blocking range is 400 nm to 490 nm or 570 nm to 700 nm, and the center wavelength, that is, the maximum transmittance of the band pass filter is 530 nm, and the bandwidth, that is, the wavelength range is confirmed to be approximately 50 nm.

Figure 6:
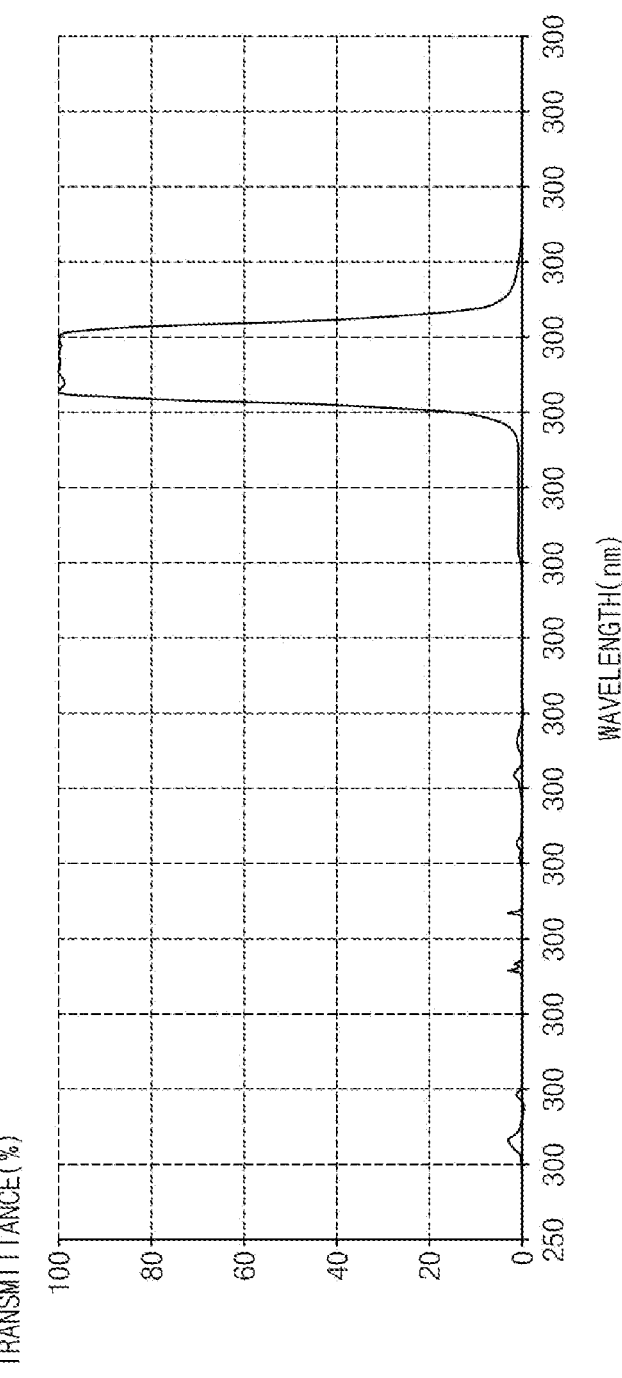
FIG. 6 is a graph showing the results of a coating simulation in the emission wavelength region of an indocyanine green (ICG) contrast agent for a refractive surface whose tangential angle does not exceed ±5° in the lens system of FIG. 1 or FIG. 3.

FIG. 6 is a graph showing the results of a coating simulation in the emission wavelength region of an indo-cyanine green (ICG) contrast agent for a refractive surface whose tangential angle does not exceed ±5° in the lens system of FIG. 1 or FIG. 3.

Likewise, by coating the refractive surfaces of the lens systems 1 and 2, the emission wavelength range of the indocyanine green (ICG) contrast agent may be limited to a specific region.

For example, as shown in FIG. 5, when the lens systems 1 and 2 limit the range of the radiation wavelength range of the ICG contrast agent, the blocking range is 350 nm to 790 nm or 880 nm to 1050 nm, and the center wavelength, that is, the maximum transmittance of the band pass filter is 832 nm, and the bandwidth, that is, the wavelength range is confirmed to be approximately 50 nm.

Accordingly, the lens systems 1 and 2 may function as a band pass filter that allows only wavelengths in a specific region to pass through by coating the refractive surface.

According to the present embodiment, the ultra-compact lens system for fluorescence imaging has a total of three lenses arranged in a row, and the shape, structure, and design of each lens are designed as described above. In addition, the ultra-compact lens system includes at least one refractive surface capable of band-pass filter coating, and the coating may be applied depending on the characteristics of the contrast agent used. Thus, a compact optical system may be implemented and the manufacturing cost for the optical system may be decreased.

In addition, for refractive surfaces that can be coated, multi-coating is possible to match the characteristics of not only one contrast agent but also two or more contrast agents, thereby expanding the range of use for fluorescent image acquisition.

That is, coating may be performed on at least one of the refractive surfaces so that only the wavelength of a light source in a specific range passes through. In this case, the tangential angle of the coated surface is maintained at ±5° or less, thereby transmittance characteristics for each wavelength of incident light may be secured at a certain level or higher.

In particular, it provides wide-angle images with a field of view of more than 100° using three lenses, making it possible to acquire fluorescent images of a relatively wide area within the living body. In addition, even though the optical system includes an aspherical surface, the inflection point is minimized and the lens shape is designed with ease of production in mind to reduce production costs. Thus, it may be effectively applied not only to fluorescent molecular imaging endoscopes but also to disposable endoscopes and optical imaging diagnostic devices.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A lens system comprising:
a first lens having a Meniscus shape comprising first and second surfaces facing each other, wherein the first surface is concave, and each of the first and second surfaces is an aspherical surface;
a second lens adjacent to the first lens and comprising third and fourth surfaces facing each other, wherein each of the third and fourth surfaces is convex and aspherical surface;
a third lens adjacent to the second lens and comprising fifth and sixth surfaces facing each other, wherein each of the fifth and sixth surfaces is concave and aspherical surface;
a glass adjacent to the third lens and comprising seventh and eighth surfaces facing each other; and
an iris having a ninth surface between the first and second lens,
wherein Equation (1) is satisfied, $$3.5 < \frac{TTL}{F} < 5.0 \qquad \text{Equation (1)}$$

when the distance from the first surface of the first lens to an upper surface located outside of the glass is TTL and a focal length of the lens system is F,
wherein Equation (3) is satisfied, $$0.8 < \frac{f2}{F} < 1.0 \qquad \text{Equation (3)}$$

when a focal length of the second lens is f2, and a focal length of the lens system is F,
wherein Equation (5) is satisfied, $$0.4 < \left| \frac{f2}{f3} \right| < 0.65 \qquad \text{Equation (5)}$$

when a focal length of the second lens is f2, and a focal length of the third lens is f3.

2. The lens system of claim 1, wherein the first lens has a negative (−) refractive power, the second lens has a positive (+) refractive power, and the third lens has a negative (−) refractive power.

3. The lens system of claim 1, wherein Equation (2) is satisfied, $$0.45 < \left| \frac{(R1 - R2)}{(R1 + R2)} \right| < 0.6 \qquad \text{Equation (2)}$$

when a radius of curvature of the first surface of the first lens is R1, and a radius of curvature of the second surface of the first lens is R2.

4. The lens system of claim 1, wherein Equation (4) is satisfied, $$Vd1 > Vd3 \qquad \text{Equation(4)}$$

when an Abbe's number of the first lens is Vd1, and an Abbe's number of the third lens is Vd3.

5. The lens system of claim, 1 wherein the aspherical surface is defined as Equation (6), $$z = \frac{ch^2}{1 + \sqrt{1 - (1 + k)c^2 h^2}} + Ah^4 + Bh^6 + Ch^8 + Dh^{10} + \ldots \qquad \text{Equation (6)}$$

when z is a distance in a direction of an optical axis from a vertex of the lens system, h is a distance in a direction perpendicular to the optical axis, c is a radius of curvature at the vertex, k is a conic constant, A is a quaternary aspherical coefficient, B is a 6th order aspherical coefficient, C is a 8th order aspherical coefficient, and D is a 10th order aspherical coefficient.

6. The lens system of claim 1, wherein at least one of the first to sixth surfaces is coated to allow only wavelengths of light sources in a predetermined range to pass through, and a tangential angle of the coated surface is ±5° or less.

\* \* \* \* \*